United States Patent
Barnes et al.

(10) Patent No.: US 7,289,617 B2
(45) Date of Patent: Oct. 30, 2007

(54) PHONE LINE SUPERVISORY CONTROLS

(75) Inventors: Michaela Barnes, Bethesda, MD (US); Stephen Vaughan Murphy, Ashburn, VA (US)

(73) Assignee: AOL LLC, Dulles, VA (US)

( * ) Notice: Subject to any disclaimer, the term of this patent is extended or adjusted under 35 U.S.C. 154(b) by 392 days.

(21) Appl. No.: 11/018,925

(22) Filed: Dec. 22, 2004

(65) Prior Publication Data

US 2006/0146701 A1    Jul. 6, 2006

(51) Int. Cl.
H04M 3/20    (2006.01)
H04M 3/22    (2006.01)
H04M 3/42    (2006.01)

(52) U.S. Cl. ............................. 379/208.01; 379/32.04; 379/194; 379/196; 379/197; 379/210.02

(58) Field of Classification Search ............. 379/32.01, 379/32.04, 93.02, 161, 168, 184, 188, 194, 379/196, 197, 200, 201.01, 207.01, 207.02, 379/207.03, 207.04, 208.01, 210.02
See application file for complete search history.

(56) References Cited

U.S. PATENT DOCUMENTS

| | | |
|---|---|---|
| 5,329,578 A | 7/1994 | Brennan et al. |
| 5,375,161 A | 12/1994 | Fuller et al. |
| 5,537,467 A | 7/1996 | Cheng et al. |
| 5,548,636 A | 8/1996 | Bannister et al. |

(Continued)

FOREIGN PATENT DOCUMENTS

WO    WO 00/60809    10/2000

OTHER PUBLICATIONS

ANONYMOUS: "Does the Internet Have Call Waiting?", Internet Document, [Online] Copyright 2002, Tech TV, Inc., pp. 1-2, Retrieved from the Internet: www.techtv.com/screensavers/print/0,23102,22596423,00.html, [retrieved on Nov. 1, 2004].

(Continued)

*Primary Examiner*—Harry S. Hong
(74) *Attorney, Agent, or Firm*—Fish & Richardson P.C.

(57) ABSTRACT

Controlling use of a telephone line includes receiving a specification from a first entity that defines one or more supervisory controls on use of a controlled telephone line by a second entity. The supervisory controls specify people with whom the second entity may or may not communicate over the controlled telephone line, and times at which the second entity may or may not communicate over the controlled telephone line. An indication of desired communications between the second entity and a third entity at a particular time over the controlled telephone line is received. A determination is made as to whether the desired communications are consistent with the specified supervisory controls. The desired communications are controlled when the desired communications are not consistent with the specified supervisory controls. In addition, the supervisory controls enable the first entity to interrupt existing calls over the controlled telephone line.

15 Claims, 9 Drawing Sheets

U.S. PATENT DOCUMENTS

| | | | |
|---|---|---|---|
| 5,557,659 A | 9/1996 | Hyde-Thomson | |
| 5,651,054 A | 7/1997 | Dunn et al. | |
| 5,802,157 A * | 9/1998 | Clarke et al. | 379/196 |
| 5,805,587 A | 9/1998 | Norris et al. | |
| 5,809,128 A | 9/1998 | McMullin | |
| 5,848,134 A | 12/1998 | Sekiguchi et al. | |
| 5,894,504 A | 4/1999 | Alfred et al. | |
| 6,215,857 B1 | 4/2001 | Kasiviswanathan | |
| 6,295,341 B1 | 9/2001 | Muller | |
| 6,301,609 B1 | 10/2001 | Aravamudan et al. | |
| 6,463,145 B1 | 10/2002 | O'Neal et al. | |
| 6,477,246 B1 | 11/2002 | Dolan et al. | |
| 6,496,501 B1 | 12/2002 | Rochkind et al. | |
| 6,671,365 B2 | 12/2003 | Kemppainen | |
| 6,738,461 B2 | 5/2004 | Trandal et al. | |

2003/0133558 A1    7/2003    Kung et al.

OTHER PUBLICATIONS

ANOYMOUS: "Did Someone Just Call You?", Internet Document, [Online] Copyright 2002, CallWave, Inc., p. 1, Retrieved from the Internet: www.callwave.com, [retrieved on Nov. 1, 2004].

ANONYMOUS: "Internet Answering Machine™ Software", Internet Document, [Online] Copyright 2002, CallWave, Inc. pp. 1-2, [Retrieved from the Internet: www.callwave.com/findoutmore.asp?ct=hp1_fom, Nov. 1, 2004].

Rick James: "FINALLY! Interactive 'Call Waiting' While You're Surfing?", Internet Document, [Online], pp. 1-4, Retrieved from the Internet: www.monitor.ca/monitor/issues/vol4iss12/feature7.html, [retrieved on Dec. 21, 2004].

* cited by examiner

PHONE LINE SUPERVISORY CONTROLS

TECHNICAL FIELD

This document relates to supervisory controls for telephone lines.

BACKGROUND

Supervisory controls may be applied to communications sent within an instant messaging system to control instant messages sent by a user of the instant messaging system. For example, supervisory controls may be specified by a parent to control instant messages sent by a child of the parent. Similarly, supervisory controls may be specified by an employer to control instant messages sent by an employee of the employer. The supervisory controls may restrict the people with whom the user may exchange instant messages. The supervisory controls also may restrict the times at which the user may send and receive instant messages.

SUMMARY

In one general aspect, controlling use of a telephone line includes receiving a specification from a first entity that defines one or more entities with whom communications over a controlled telephone line are controlled for a second entity. An indication of desired communications between the second entity and a third entity over the controlled telephone line is received. A determination is made as to whether the third entity is one of the specified entities with whom communications over the controlled telephone line are controlled. The communications between the second entity and the third entity are controlled when the third entity is one of the entities with whom communications are controlled for the second entity.

Implementations may include one or more of the following features. For example, receiving the specification from the first entity of entities with which communications with the second entity are controlled may include presenting for use by the first entity a graphical user interface capable of receiving the specification of entities with whom communications over the controlled telephone line are controlled for the second entity.

The specification from the first entity that defines one or more entities with whom communications over the controlled telephone line are controlled for the second entity may include one or more entities with whom the second entity may or may not communicate over the controlled telephone line.

Receiving an indication of desired communications between the second entity and the third entity over the controlled telephone line may include receiving a call initiation request from the second entity over the controlled telephone line to the third entity, or receiving a call initiation request to the second entity from the third entity over the controlled telephone line. Receiving an indication of desired communications between the second entity and the third entity over the controlled telephone line also may include receiving an indication from a telephone network over which the second entity and the third entity may communicate that a request for initiation of a call between the second entity and the third entity over the controlled telephone line has been received.

The first entity may be a user of an online service provider system.

The specification that defines the entities with whom communications are controlled for the second entity may define the entities from the online service provider system. The specification that defines the entities with whom communications are controlled for the second entity may define the entities from a list of contacts maintained by the first entity on the online service provider system. The list of contacts may be an address book, a buddy list, or a white list. Controlling the communications between the second entity and the third entity when the third entity is one of the entities with whom communications are controlled for the second entity may include generating a request for initiation of a call with the third entity in response to selection of the third entity from the list of contacts by the second entity. Determining if the third entity is one of the specified entities with whom communications are controlled for the second entity may include querying the online service provider system as to whether the third entity is one of the specified entities with whom communications are controlled for the second entity.

Determining if the third entity is one of the specified entities with whom communications are controlled for the second entity may include querying for the presence of the third entity in a database of entities with whom communications are controlled for the second entity.

The second entity may be a child and the first entity may be a parent of the child. Alternatively, the second entity may be an employer and the first entity may be an employee of the employer.

A determination may be made as to whether time information specified by the first entity indicates that the desired communications are to be regulated. Controlling the communications between the second entity and the third entity may include controlling the communications between the second entity and the third entity when the third entity is one of the entities with whom communications are controlled for the second entity and when the time information indicates that the desired communications are to be regulated.

A determination may be made as to whether time information specified by the first entity indicates that the desired communications are not to be regulated. Controlling the communications between the second entity and the third entity may include controlling the communications between the second entity and the third entity when the third entity is one of the entities with whom communications are controlled for the second entity and when the time information indicates that the desired communications are to be regulated.

The first entity may be notified when the third entity is one of the entities with whom communications are controlled for the second entity. The first entity and the second entity both may be users of the controlled telephone line.

In another general aspect, controlling use of a telephone line includes receiving a specification from a first entity that defines time information used to regulate use of a controlled telephone line by a second entity. An indication of desired communications between the second entity and a third entity over the controlled telephone line is received. A determination is made as to whether the specified time information indicates that the desired communications are to be regulated. The second entity is enabled to use the controlled telephone line when the specified time information indicates that requested use of the controlled telephone line is not to be regulated. The second entity is prevented from using the controlled telephone line when the specified time information indicates that requested use of the controlled telephone line is to be regulated.

Implementations may include one or more of the following features. For example, receiving the specification from the first entity that defines time information used to regulate use of the controlled telephone line by the second entity may include presenting for use by the first entity a graphical user interface capable of receiving specification of the time information to be used by the first entity.

Receiving the specification that defines the time information may include receiving specification of times at which the second entity may use the controlled telephone line. Determining if the specified time information indicates that the desired communications are to be regulated may include determining if a time at which the request for use of the controlled telephone line is received is not one of the times at which the second entity may use the controlled telephone line.

Receiving the specification of the time information may include receiving specification of times at which the second entity may not use the controlled telephone line. Determining if the specified time information indicates that the desired communications are to be regulated may include determining if a time at which the request for use of the controlled telephone line is received is one of the times at which the second entity may not use the controlled telephone line.

Receiving the specification of the time information may include receiving specification of an amount of time that the second entity may use the controlled telephone line. Determining if the specified time information indicates that the desired communications are to be regulated may include determining if an amount of time for which the second entity has used the controlled telephone line is greater than the specified amount of time that the second entity may use the controlled telephone line.

Receiving an indication of desired communications between the second entity and a third entity over the controlled telephone line may include receiving a call initiation request to the second entity from the third entity over the controlled telephone line. Preventing the second entity from using the controlled telephone line may include allowing a phone used by the third entity to generate the call initiation request to ring for the third entity. Preventing the second entity from using the controlled telephone line may include enabling the third entity to leave a message for the second entity. The message may be sent to the second entity in an e-mail message.

Preventing the second entity from using the controlled telephone line may include allowing a phone used by the third entity to generate the call initiation request to ring busy for the third entity, or playing a message for the third entity indicating that the second entity is not permitted to use the controlled telephone line.

Receiving the indication of desired communications between the second entity and a third entity over the controlled telephone line may include receiving a call initiation request from the second entity to the third entity over the controlled telephone line.

Receiving the specification that defines the time information used to regulate use of the controlled telephone line may include receiving specification of the time information from an online service provider system used by the first entity.

Receiving the indication of desired communications between the second entity and a third entity over the controlled telephone line may include receiving the indication from a telephone network that services the controlled telephone line.

Receiving specification of the time information used to regulate use of the controlled telephone line may include querying for the presence of the time information in a database of time information.

The second entity may be notified of an amount of time remaining until use of the controlled telephone line by the second entity will be prevented. Notifying the second entity of an amount of time remaining may include playing a message over the controlled telephone line indicating the amount of time remaining.

The second entity may be notified of an amount of time remaining until use of the controlled telephone line by the second entity is enabled. Notifying the second entity of an amount of time remaining may include sending a message indicating the amount of time remaining to the second entity.

The second entity may be a child and the first entity may be a parent of the child. Alternatively, the second entity may be an employer and the first entity may be an employee of the employer.

A determination may be made as to whether the third entity is an entity that has been specified by the first entity as an entity with whom communications over the controlled telephone line are controlled. Enabling the second entity to use the controlled telephone line may include enabling the second entity to use the controlled telephone line when the specified time information indicates that the desired communications are not to be regulated and when the third entity is not an entity with whom communications over the controlled telephone are controlled. Preventing the second entity from using the controlled telephone line may include preventing the second entity from using the controlled telephone line when the specified time information indicates that the desired communications are to be regulated or when the third entity is an entity with whom communications over the controlled telephone are controlled.

A determination may be made as to whether the third entity is an entity that has been specified by the first entity as an entity with whom communications over the controlled telephone line are not controlled. Enabling the second entity to use the controlled telephone line may include enabling the second entity to use the controlled telephone line when the specified time information indicates that the desired communications are not to be regulated and when the third entity is an entity with whom communications over the controlled telephone are not controlled. Preventing the second entity from using the controlled telephone line may include preventing the second entity from using the controlled telephone line when the specified time information indicates that the desired communications are to be regulated or when the third entity is not an entity with whom communications over the controlled telephone are not controlled.

The first entity may be notified when the specified time information indicates that requested use of the controlled telephone line is to be regulated. The first entity and the second entity both may be users of the controlled telephone line.

In another general aspect, interrupting telephone calls includes receiving specification from a first user that defines telephone line controllers whose calls are enabled to interrupt other calls on a controlled telephone line. A telephone call is operated on the controlled telephone line that does not involve one of the telephone line controllers. A telephone call to the controlled telephone line is received while the controlled telephone line is busy with the operated call. A determination may be made as to whether the received call was placed by one of the telephone line controllers. The received call is enabled to interrupt the operated call when the received call is from one of the telephone line controllers.

Implementations may include one or more of the following features. For example, receiving the specification from the first user that defines the telephone line controllers whose calls are enabled to interrupt other calls on a controlled telephone line may include presenting for use by the first user a graphical user interface capable of receiving the specification of the telephone line controllers whose calls are enabled to interrupt other calls on a controlled telephone line.

The specification from the first user may define phone numbers from which the telephone line controllers may place telephone calls to the controlled telephone line. Determining whether the received call was placed by one of the telephone line controllers may include determining whether the received call is from one of the phone numbers from which the telephone line controllers may place telephone calls to the controlled telephone line.

Receiving the specification that defines the telephone line controllers may include receiving the specification from an online service provider system used by one of the telephone line controllers.

Determining whether the received call was placed by one of the telephone line controllers may include querying for the presence of a caller that placed the received call in a database of telephone line controllers.

Enabling the received call to interrupt the operated call may include notifying entities involved in the operated call that the operated call is going to be interrupted, and interrupting the operated call with the received call. Notifying the entities involved in the operated call may include playing a message for the entities involved in the operated call announcing that the operated call is going to be interrupted.

A caller that placed the received call may be prompted for a code, and the code may be received from the caller. Determining whether the received call was placed by one of the telephone line controllers may include determining whether the received code matches an authorization code that indicates that the caller is one of the telephone line controllers. Enabling the received call to interrupt the operated call may include enabling the received call to interrupt the operated call when the received code matches the authorization code. Prompting the caller for the code may include prompting the caller to dial the code on a telephone used by the caller to place the received call. Receiving the code from the caller may include receiving the code as a series of dialed numbers from the telephone used by the caller.

A determination may be made as to whether an entity involved in the telephone call that is operating on the controlled telephone line is an entity that has been specified by the first user as an entity whose calls over the controlled telephone line may be interrupted. Enabling the received call to interrupt the operated call may include enabling the received call to interrupt the operated call when the received call is from one of the telephone line controllers and when the entity involved in the telephone call operating on the controlled telephone line is an entity whose calls may be interrupted.

A determination may be made as to whether an entity involved in the telephone call that is operating on the controlled telephone line is an entity that has been specified by the first user as an entity whose calls over the controlled telephone line may not be interrupted. Enabling the received call to interrupt the operated call when the received call is from one of the telephone line controllers may include enabling the received call to interrupt the operated call when the received call is from one of the telephone line controllers and when the entity involved in the telephone call operating on the controlled telephone line is not an entity whose calls may not be interrupted.

A determination may be made as to whether time information specified by the first user indicates that the operated call may be interrupted. Enabling the received call to interrupt the operated call when the received call is from one of the telephone line controllers may include enabling the received call to interrupt the operated call when the received call is from one of the telephone line controllers and when the time information indicates that the operated call may be interrupted.

A determination may be made as to whether time information specified by the first user indicates that the operated call may not be interrupted. Enabling the received call to interrupt the operated call when the received call is from one of the telephone line controllers may include enabling the received call to interrupt the operated call when the received call is from one of the telephone line controllers and when the time information does not indicate that the operated call may be interrupted.

The telephone line controllers may be users of the telephone line.

These general and specific aspects may be implemented using a system, a method, or a computer program, or any combination of systems, methods, and computer programs.

Other features will be apparent from the description and drawings, and from the claims.

DESCRIPTION OF DRAWINGS

Like reference symbols in the various drawings indicate like elements.

DETAILED DESCRIPTION

Supervisory controls are specified for a controlled telephone line by a controller of the telephone line to restrict use of the controlled telephone line by other users of the controlled telephone line. For example, the supervisory controls may include a list of people with whom the other users may or may not communicate over the controlled telephone line. As another example, the supervisory controls may include indications of times at which the other users may use the controlled telephone line or amounts of time for which the other users may use the controlled telephone line. The controller also may be enabled to interrupt calls on the controlled telephone line involving the other users when calling from an external telephone.

Figure 1:
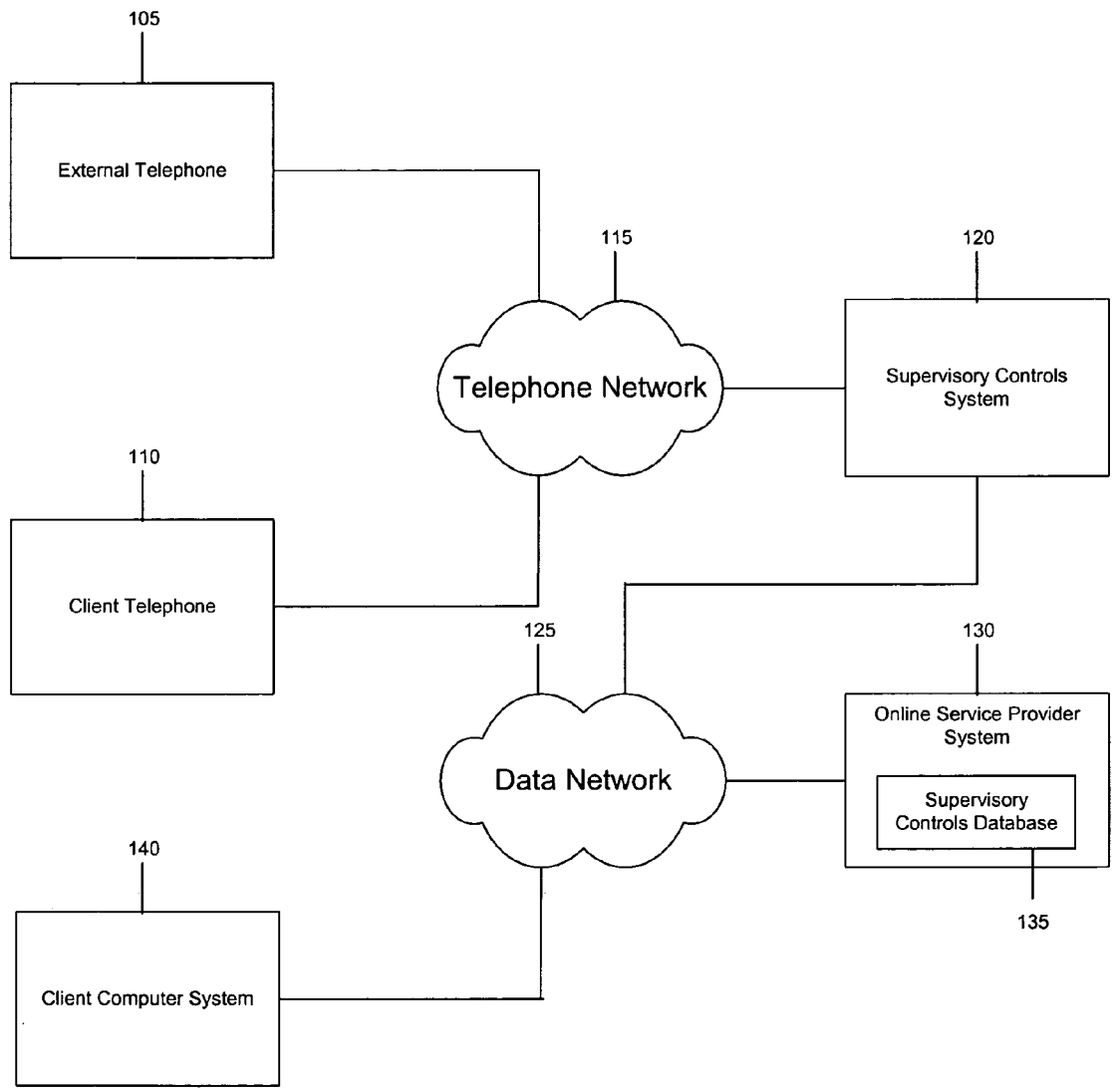
FIG. 1 is a block diagram of a communications system for providing supervisory controls for a telephone line.

Referring to FIG. 1, a communications system 100 for applying supervisory controls to telephone calls includes an external telephone 105, a client telephone 110, a telephone network 115, a supervisory controls system 120, a data network 125, an online service provider system 130 that includes a supervisory controls database 135, and a client computer system 140.

The external telephone 105 is configured to place a call to, or to receive a call from, the client telephone 110 across the telephone network 115. The external telephone 105 and the client telephone 110 may be landline phones that allow communications over the telephone network 115. In another implementation, each of the external telephone 105 and/or the client telephone 110 may be a cellular phone or a mobile personal digital assistant (PDA) with embedded cellular phone technology. In yet another implementation, the client telephone 110 may integrate the client computer system 140 and operate as a single computer system.

A controller of a telephone line to which the client telephone 110 is connected controls use of the client telephone 110 and of the telephone line. For example, use of the client telephone 110 may be controlled for a child by a parent of the child. As another example, use of the client telephone 110 may be controlled for an employee by an employer. The controller specifies rules or criteria that, when satisfied, allow use of the controlled telephone line. For example, the rules may indicate that the other users of the client telephone 110 may only use the client telephone 110 to communicate with particular people, at particular times, or for particular amounts of time. In one implementation, the controller may specify different rules for different users of the client telephone 110.

The telephone network 115 is configured to enable direct or indirect voice communications between the external telephone 105, the client telephone 110, and the supervisory controls system 120. When a user of the external telephone 105 places a call to, or receives a call from, the client telephone 110, the telephone network 115 is configured to forward the call to the supervisory controls system 120. Alternatively or additionally, signaling paths for the call may be established between the client telephone 110 and the supervisory controls system 120, and between the external telephone 105 and the supervisory controls system 120.

The telephone network 115 is configured to send call-related information to the supervisory controls system 120, either with the forwarded call, or over the signaling paths that have been established. The call-related information includes call origin and call destination information. The call origin information may include a direct number of a telephone from which the call is placed, and a time and date when the call was initiated. Similarly, the call destination information may include a direct number of a telephone to which the call is placed. The call origin information may be delivered, for example, through an Automatic Number Identification (ANI) of the call, and the call destination information may be delivered, for example, by extracting called number information from the integrated services digital network (ISDN) call setup or, alternatively, through a service known as the Dialed Number Identification Service (DNIS).

The telephone network 115 also is configured to receive call handling instructions from the supervisory controls system 120. The call handling instructions are instructions that tell the telephone network 115 how to process a call. The call handling instructions may include, for example, instructions to accept a call, block a call, or forward a call to another telephone number (e.g., to a telephone number corresponding to a voicemail system or to a different telephone).

The telephone network 115 may include a circuit-switched voice network, a packet-switched data network, or any other network able to carry voice data. For example, circuit-switched voice networks may include a Public Switched Telephone Network (PSTN), and packet-switched data networks may include networks based on the Internet protocol (IP) or asynchronous transfer mode (ATM), and may support voice using, for example, Voice-over-IP, Voice-over-ATM, or other comparable protocols used for voice data communications.

The supervisory controls system 120 is a computer system configured to receive an indication of a call from the external telephone 105 or the client telephone 110 from the telephone network 115. The indication may be received as a result of the call being forwarded to the supervisory controls system 120, or as a result of signaling paths for the call being established through the supervisory controls system 120. The supervisory controls system 120 may apply special handling to the call based on supervisory controls specified in the supervisory controls database 135 of the online service provider system 130. Applying the special handling to the call may include sending signals that cause the special handling to be applied to the call to the telephones 105 and 110. The signals may include Signaling System 7 (SS7) signals, Session Initiation Protocol (SIP) signals, H.323 signals, or other types of call handling signals.

The supervisory controls system 120 identifies special handling to be applied to the call based on the call-related information received from the telephone network 115. More particularly, the call-related information is used to identify the special handling from the supervisory controls database 135. The supervisory controls to be applied to the call may be identified, for example, by accessing an account record indexed by a portion of the received information and stored in supervisory controls database 135.

When the call is placed from the external telephone 105, the special handling applied to the call may include ignoring the call such that the call is not answered at the client telephone 110 and is allowed to ring continuously at the external telephone 105. Alternatively, a message, such as an audio message, that instructs the user of the external telephone 105 not to call the client telephone 110 again may be sent to the telephone network 115 or the external telephone 105. An electronic message that inspires an audio message indicating the unavailability of the client telephone 110 to the external telephone 105 also may be sent to the telephone network 115.

When the call is placed from the client telephone 110, the special handling applied to the call may include blocking the call such that the call is not completed and is not received at the external telephone 105. Alternatively or additionally, a message, such as an audio message, that informs a user of the client telephone 110 that the call will not be completed may be sent to the telephone network 115 or the client telephone 110. An electronic message that inspires an audio message indicating that the call will not be completed also may be sent to the telephone network 115.

If supervisory controls indicate that the no special handling is to be applied to the call, then the call may be handled regularly. For example, a voice path of the call may be routed to either the external telephone 105 or the client telephone 110, or to another telephone system, such as a specified cell phone or a voicemail system. Notifications of the call and the special handling applied to the call may be sent to the external telephone 105, the client telephone 110, or a computer system associated with the external telephone 105 or the client telephone 110, based on preferences associated with the telephones 105 and 110 or the computer system.

The data network 125 is configured to enable direct or indirect communications between the supervisory controls system 120, the online service provider system 130, and one or more client computer systems 140. Examples of the data network 125 include the Internet, Wide Area Networks (WANs), Local Area Networks (LANs), analog or digital wired and wireless telephone networks (e.g., Public Switched Telephone Network (PSTN), Integrated Services Digital Network (ISDN), and Digital Subscriber Line (xDSL)), radio, television, cable, satellite, and/or any other delivery or tunneling mechanism for carrying data.

In some implementations, the data network 125 and the telephone network 115 are implemented by a single or otherwise integrated communications network configured to enable voice communications between the external telephone 105, the client telephone 110, and the supervisory controls system 120, and to enable communications between the supervisory controls system 120, the online service provider system 130, and the one or more client computer systems 140.

The online service provider system 130 is a computer system configured to provide online data communications services to users, detect online presence of users of client computer systems 140, and receive call notification messages from the supervisory controls system 120. The online data communications services may include for example, e-mail services, instant messaging services, Internet access, and/or access to online content. The online service provider system 130 may detect online presence of users of client computer systems 140 in, for example, a manner similar to that used to detect presence in an instant messaging system and/or in a manner similar to that disclosed in U.S. patent application Ser. No. 10/414,167, which is hereby incorporated by reference in its entirety, and which describes the use of client-side communication device monitors.

The online service provider system 130 includes a supervisory controls database 135 that includes supervisory controls for the client telephone 110 and the telephone line to which the client telephone 100 is connected. The supervisory controls database 135 includes the rules that control use of the client telephone 110 and are specified by the controller of the telephone line. In some implementations, the supervisory controls database 135 includes rules that control multiple telephones and telephone lines. In such implementations, the rules to be applied to a particular telephone or a particular telephone line may be identified by a phone number of the particular telephone or the particular telephone line, or by a screen name or other identifier of a controller of the particular telephone line. In some implementations, the supervisory controls database 135 includes supervisory controls that may be applied to multiple different communications systems. For example, the supervisory controls included in the supervisory controls database 135 may be used to control instant messaging communications and e-mail communications in addition to communications that use the client telephone 110.

The supervisory controls database 135 also may include a mapping of identifiers of people to phone numbers typically used by the person. For example, the supervisory controls database 135 may include an indication of phone numbers typically used by a controller of a controlled telephone line, which may include a phone number of the controlled telephone line, as well as other phone numbers used by the controller. In addition, the database 135 may relate a phone number of the external telephone 105 to an identifier of a user of the external telephone 105. The mapping may be used to identify people involved in a telephone call based on phone numbers to and from which the call was placed The client computer system 140 is configured to enable the controller of the telephone line used by the client telephone 110 to specify rules governing the use of the client telephone 110 and the telephone line. For example, interfaces that enable the specification of the rules may be presented to the controller on the client computer system 140. The rules specified by the controller with the client computer system 140 are transferred to the online service provider system 130 for storage in the supervisory controls database 135.

The client computer system 140 may be a general purpose computer, such as a workstation or a personal computer, a PDA, a special purpose computer, an intelligent mobile phone, a pager, or a set top box. The client computer system 140 may include one or more software or hardware applications that command and direct communications between the client computer system 140 and the online service provider system 130. The applications may enable digital communications to be received from the online service provider system 130. For example, the applications may include a modified instant messaging application configured to receive notification messages and send selected options in a manner similar to that used to receive and send instant messages.

In some implementations, the supervisory controls system 120 may be integrated into the client computer system 140, particularly when the client computer system 140 may connect to the telephone line used by the client telephone 110. For example, when the client telephone 110 connects to the telephone network 115 through the client computer system 140, the client computer system 140 may include the supervisory controls system 120. To facilitate control by the client computer system 140, the client telephone 110 may be integrated into the client computer system 140. As a result, the client computer system 140 connects both to the telephone network 115 and the data network 125. In such implementations, the telephone network 115 normally routes calls between the external telephone 105 and the client telephone 110. When a call is placed to or from the client telephone 110, the call is intercepted by the supervisory controls system 120 integrated into the client computer system 140, and the supervisory controls system 120 determines whether special handling should be applied to the call. Such a determination may be based on supervisory controls relevant to the client telephone 110 that are accessed from the supervisory controls database 135. Alternatively or additionally, the determination may be based on supervisory controls relevant to the client telephone 110 that are stored locally on the client computer system 140 or the supervisory controls system 120. The supervisory controls system 120 may instruct the telephone network 115 to apply the special handling to the call, or may apply the special handling to the call itself.

Figure 2:
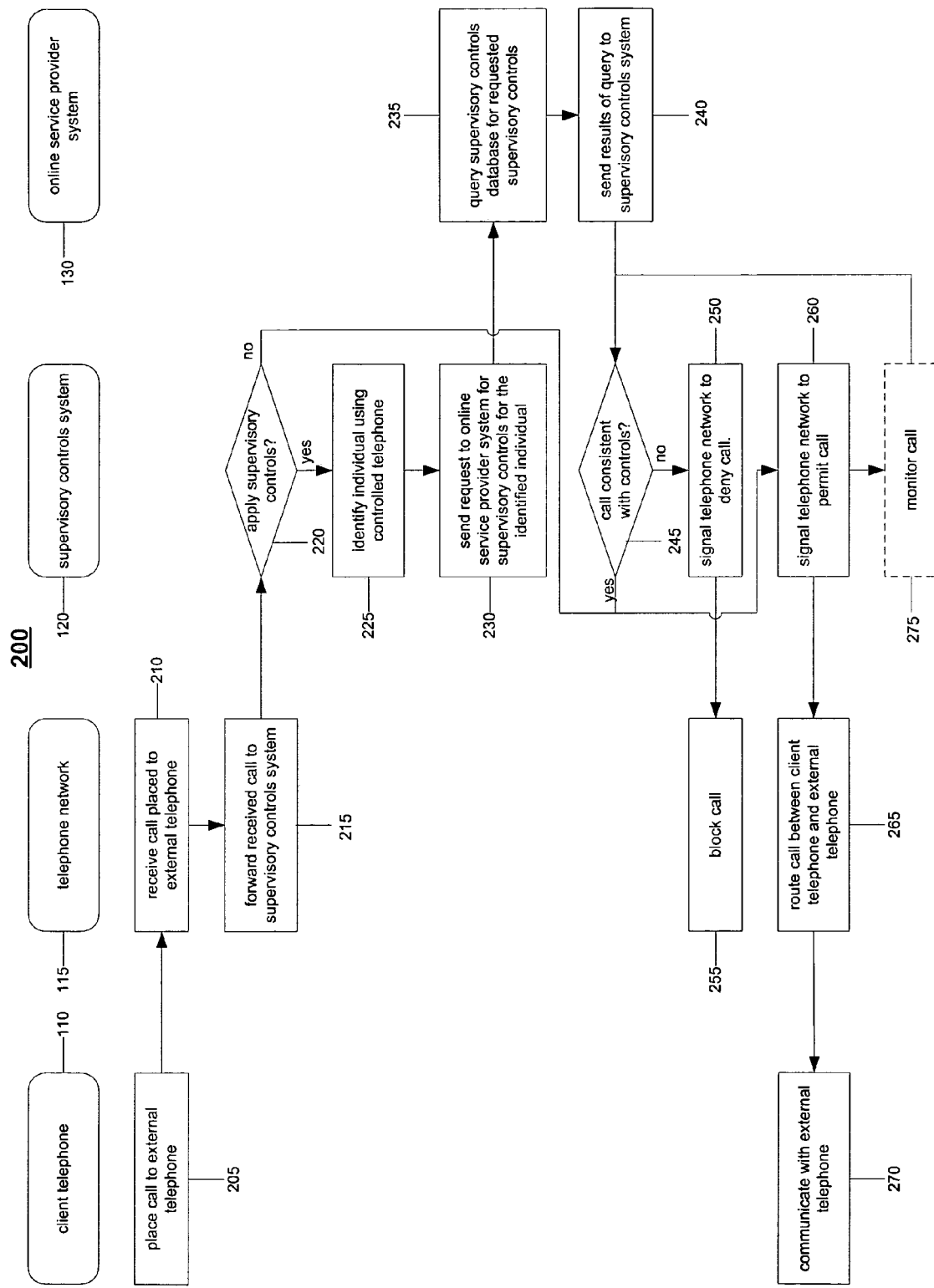
FIG. 2 is flow chart of a process for applying supervisory controls to telephone calls in the communications system of FIG. 1.

Referring to FIG. 2, a process 200 is used to apply supervisory controls to phone calls involving a telephone line for which supervisory controls have been specified. When a call is received on the telephone line, the process 200 is used to verify that supervisory controls have been enabled for the telephone line. If supervisory controls have been enabled, the call is handled according to the supervisory controls. The process 200 involves various components of the communications system 100 of FIG. 1, such as the client telephone 110, the telephone network 115, the supervisory controls system 120, and the online services provider system 130.

The client telephone 110 places a call to an external telephone, such as the external telephone 105 of FIG. 1 (205). The telephone network 115 receives the call placed to the external telephone by the client telephone 110 (210). Alternatively, the telephone network 115 may receive a call placed to the client telephone 110 by the external telephone. The telephone network 115 routes the received call to the supervisory controls system 120 (215). The call may be routed to the supervisory controls system 120 by forwarding the call to the supervisory controls system, or by establishing signaling paths for the call through the supervisory controls system 120. When routing the call, the telephone network 115 also sends information describing the call, such as information identifying an origin and a destination of the call, as well as a time at which the call was initiated. Alternatively, the call may be received by the supervisory controls system 120 directly from the client telephone 110 before the call reaches the telephone network 115

The supervisory controls system 120 determines whether supervisory controls should be applied to the call (220). The supervisory controls system 120 may make such a determination based on the information describing the call that was received from the supervisory controls system 120. For example, the supervisory controls system 120 may use the information to determine if supervisory controls have been specified for the origin or the destination of the call. For example, the supervisory controls system 120 may maintain and use configuration information that indicates whether supervisory controls have been specified for the origin or the destination. Alternatively, the supervisory controls system 120 may query the online service provider system 130 to determine whether supervisory controls have been specified for the origin or the destination. The online service provider system 130 may maintain configuration information that indicates whether supervisory controls have been specified for the origin or the destination. Alternatively, the online service provider system 130 may determine whether supervisory controls have been specified for the origin or the destination by determining whether a supervisory controls database maintained by the online services provider system 130, such as the supervisory controls database 135 of FIG. 1, includes supervisory controls for the origin or the destination.

If supervisory controls are to be applied to the call, then the supervisory controls system 120 identifies an individual using a controlled telephone for which the supervisory controls have been specified (225). For example, the supervisory controls system 120 may determine whether supervisory controls are to be applied to the origin or the destination of the call, and whether calls are controlled for a particular person at the origin or the destination. The supervisory controls system 120 may make such an identification based on information stored in the supervisory controls database that relates an identifier of the individual to phone numbers used by the individual. An individual corresponding to the phone number to or from which the call was placed is the individual using the controlled telephone.

The supervisory controls system 120 sends a request to the online service provider system 130 for supervisory controls for the identified individual (230). The online service provider system 130 receives the request and queries the supervisory controls database for the requested supervisory controls (235). The request sent by the supervisory controls system 120 may include the call information received from the telephone network 15, which may be used by the online service provider system 130 to query the supervisory controls database for the requested supervisory controls. For example, supervisory controls may be stored in the supervisory controls database based on the location to which supervisory controls are to be applied. The indications of the location to which supervisory controls are to be applied from the call information may be used to identify and retrieve the requested supervisory controls from the supervisory controls database. The online service provider system 130 sends the results of the query, which are the requested supervisory controls, to the supervisory controls system 120 (240).

The supervisory controls system 120 determines whether the call is consistent with the requested supervisory controls received from the online service provider system 130 (245). More particularly, the supervisory controls system 120 determines if rules and constraints for allowing the call specified by the supervisory controls are satisfied. For example, the supervisory controls system 120 may determine if people involved in the call are people for whom the call should be allowed. As another example, the supervisory controls system 120 may determine if a time at which the call is occurring is a time at which the call should be allowed. If not, then the supervisory controls system 120 signals the telephone network 115 to deny the call (250), and the telephone network 115 consequently blocks the call (255). If the call originated at the external telephone, blocking the call may include allowing the call to ring at the external telephone without being answered at the client telephone 110. If the call originated at the client telephone 110, blocking the call may include failing to complete the call such that the call is not received at the external telephone.

A message may be sent to the client telephone 110 or the external telephone to inform users of the client telephone 110 or the external telephone that the call has been blocked. In addition, a notification that the call is not consistent with the supervisory controls may be sent to a controller of the client telephone 110. For example, an e-mail message indicating that the call is not consistent with the supervisory controls may be sent to the controller. Alternatively or additionally, a notification may be sent to the controller when the call is determined to be inconsistent such that the controller may override the supervisory controls and indicate that the call should be allowed. In some implementations, notifications of one or more calls may be sent to the controller, even when the calls are consistent with the supervisory controls.

If the call is consistent with the requested supervisory controls (245), or if supervisory controls were not to be applied to the call (220), then the supervisory controls system 120 signals the telephone network 115 to allow the call (260). As a result, the telephone network 115 routes the call between the client telephone 110 and the external telephone (265), which enables the client telephone 110 to communicate with the external telephone (270).

In addition, the supervisory controls system 120 may monitor the call to verify that the call remains consistent with the requested supervisory controls (275). For example, the call may be monitored to verify the call still satisfies time constraints of the requested supervisory controls. As long as the call remains consistent with the supervisory controls (245), then the call is permitted to proceed normally (260, 265, 270). However, if the call becomes inconsistent with the requested supervisory controls, then the supervisory controls system 120 may signal the telephone network 115 to deny the call (250), and the telephone network 115 may terminate the call, with or without notification that the call has become inconsistent with the supervisory controls and consequently needs to be terminated (255).

Figure 3:
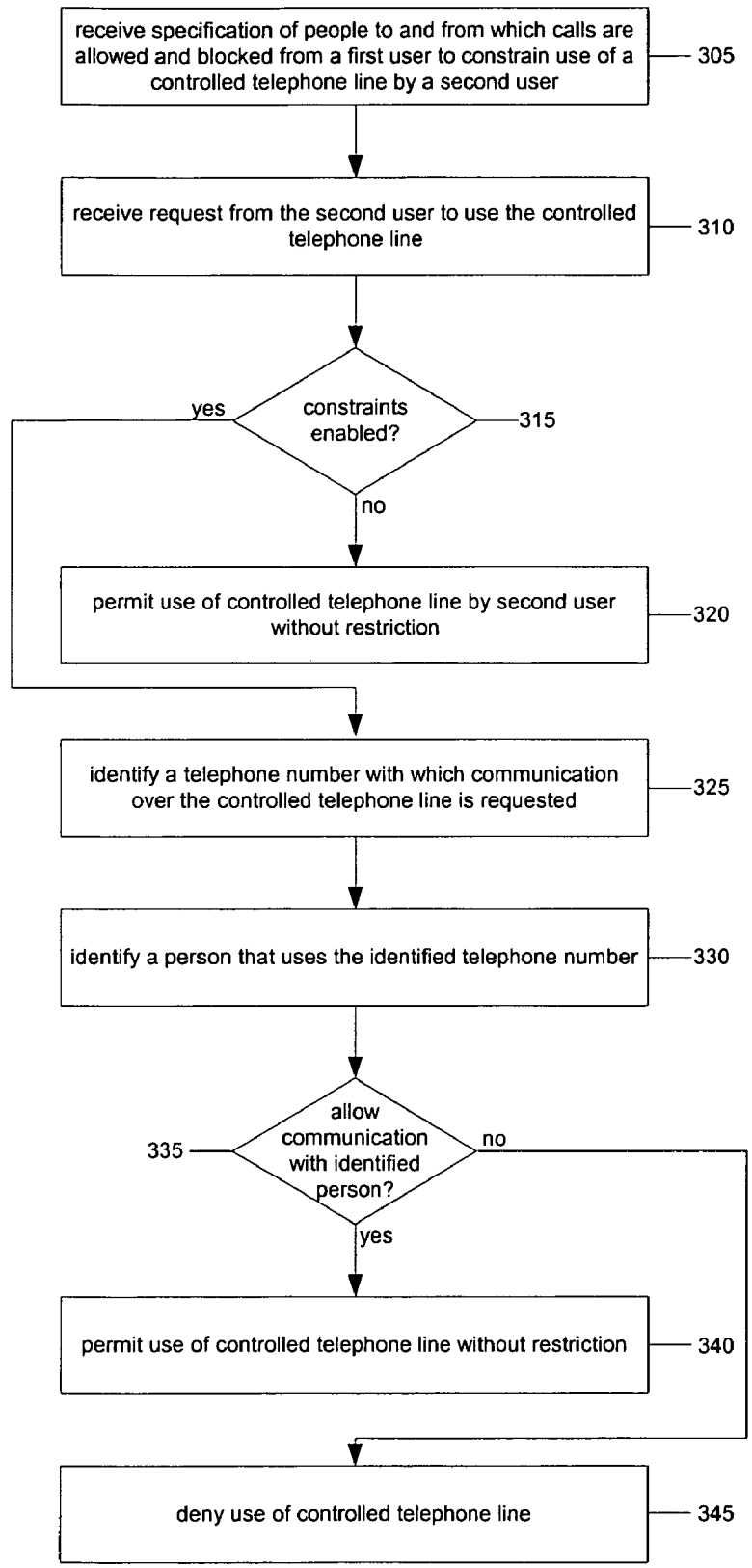
FIG. 3 is flow chart of a process for handling a controlled telephone call based on people involved in the telephone call.

Referring to FIG. 3, a process 300 is used to control telephone calls placed over a controlled telephone line such that the controlled telephone line may only be used to communicate with particular people. The particular people are specified by a controller of the telephone line, and phone calls of other users of the controlled telephone line to the specified people may be affected. The process 300 may be performed generally on the communications system 100, and more particularly on the supervisory controls system 120 and the online service provider system 130, all of FIG. 1.

A first user specifies people with whom calls over the controlled telephone line involving a second person are allowed or blocked, and such specification is received by, for example, the online service provider system 130 (305). The first user may be a controller, such as a parent or an employer, of the controlled telephone line that constrains the use of the controlled telephone line by the second user by specifying the people. The first user may specify the people on user interfaces presented on a computer system used by the first user, such as the client computer system 140 of FIG. 1. The computer system forwards the list of people specified by the first user with the user interfaces to the online service provider system 130, which stores the list of people in a supervisory controls database, such as the supervisory controls database 135 of FIG. 1, with an identifier of the controlled telephone line, such as a phone number of the controlled telephone line, or with an identifier of a controller of the controlled telephone line, such as a screen name of the controller. The list of people limits the people with whom the second user may place or receive telephone calls over the controlled telephone line.

A request to use the controlled telephone line is received from the second user (310). For example, the second user may request to use a client telephone, such as the client telephone 110 of FIG. 1, to call a particular person on the external telephone, such as the external telephone 105 of FIG. 1. Alternatively, a call from the particular person on the external telephone to the second user on the client telephone may be received on the controlled telephone line. A telephone network connecting the external telephone and the client telephone, such as the telephone network 115 of FIG. 1, may route the requested call to the supervisory controls system 120, along with information describing the requested call, such as telephone numbers of the client telephone and the external telephone, identifiers of users of the client telephone and the external telephone, or a time at which the call was requested. Alternatively, the call may be received by the supervisory controls system 120 directly from the client telephone or the external telephone.

The supervisory controls system 120 or the online service provider system 130 determines whether constraints on the use of the controlled telephone are enabled for the second user (315). Such a determination may be based on local configuration information that identifies users of telephone lines whose calls are controlled. Alternatively or additionally, the online service provider system 130 may determine whether time constraints have been enabled for the second user by determining whether a list of people with whom the second user may or may not communicate has been stored in the supervisory controls database.

If constraints have not been enabled for the second user, then use of the controlled phone line by the second user is permitted without restriction (320). Therefore, the second user is permitted to communicate with the particular person on the external telephone, as requested. However, if constraints have been enabled for the second user, then the supervisory controls system 120 identifies a telephone number with which the second user has requested to communicate (325). More particularly, the supervisory controls system 120 determines a phone number of the external telephone. In addition, the supervisory controls system 120 identifies a person that uses the identified telephone (330). More particularly, the supervisory controls system 120 identifies a user of the external telephone. In one implementation, the supervisory controls system 120 may identify the telephone number and the corresponding person based on information routed to the supervisory controls system 120 by the telephone network that connects the client telephone and the external telephone. In another implementation, the supervisory controls system 120 may identify the telephone number and the corresponding person based on local configuration information that identifies users of telephone lines for which calls are controlled. In another implementation, the online service provider system 130 may identify the telephone number and the corresponding person by determining whether a list of people with whom the second user may or may not communicate have been stored in the supervisory controls database.

The supervisory controls system 120 then determines whether the second user should be allowed to communicate with the identified person (335). For example, the supervisory controls system 120 may determine whether the identified person is one of the people with whom the second user is or is not allowed to communicate over the controlled line. If the first user specified a list of people with whom the second user may communicate, then the supervisory controls system 120 may determine that the second user is allowed to communicate with the identified person when the identified person is found on the specified list. If the first user specified a list of people with whom the second user may not communicate, then the supervisory controls system 120 may determine that the second user is allowed to communicate with the identified person when the identified person is not found on the specified list.

If the second user is allowed to communicate with the identified person, then the second user is permitted to use the controlled telephone line (340). For example, the supervisory controls system 120 may signal the telephone network connecting the client telephone and the external telephone to enable the second user to communicate with identified person on the external telephone using the client telephone. If the second user is not allowed to communicate with the identified person, then the second user is not allowed to use the controlled telephone line (345). For example, the supervisory controls system 120 may signal the telephone network to prevent the second user from communicating with the external telephone using the client telephone. The second user may be notified that use of the controlled phone line has been denied. For example, a message that indicates that use of the controlled telephone line has been denied may be presented to the second user on the client telephone or on a computer system used by the second user, such as the client computer system 140 of FIG. 1.

Figure 4:
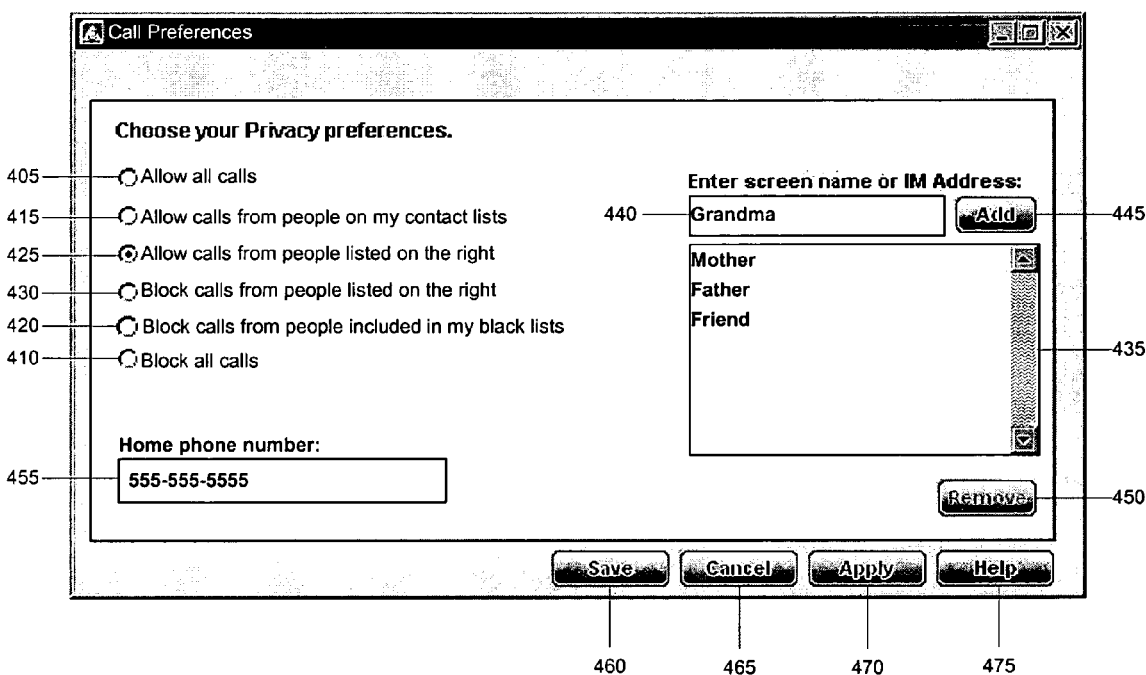
FIG. 4 is an illustration of an interface for specifying people with whom controlled telephone calls may and may not occur.

Referring to FIG. 4, an exemplary interface 400 may be used by a controller of a controlled telephone line to specify people with whom other users of the controlled telephone line may or may not communicate over the controlled telephone line. The interface 400 may be used to select a list of people with whom the other users may or may not communicate. The interface 400 includes options 405-430 that may be used to select the list of people. Text fields 435 and 440 and button 445 and 450 are used to display and modify the list of people. A text field 455 is used to specify a phone number or a controller of the controlled telephone line. Buttons 460-475 are used to accept and reject changes made with the interface 400.

The options 405-430 enable a controller of a controlled telephone line to choose a list of people with whom other users of the controlled telephone line may or may not communicate over the controlled telephone line. In one implementation, the options 405-430 are mutually exclusive in that only one of the options 405-430, and only one of the corresponding lists of people, may be selected at one time. In another implementation, more than one of the options 405-430 may be selected at one time.

The option 405 causes all calls placed to and from the controlled telephone line to be allowed such that there are no restrictions on with whom the other users may communicate. In other words, selecting the option 405 may select a list of all people as a list of people with whom the other users may communicate over the controlled telephone line. Alternatively, selecting the option 405 may select an empty list as a list of people with whom the other users may not communicate over the controlled telephone line. Similarly, the option 410 causes all calls placed to and from the controlled telephone line to be blocked such that the other users may not communicate with anyone. In other words, selecting the option 410 may select a list of all people as a list of people with which the other users may not communicate over the controlled telephone line. Alternatively, selecting the option 410 may select an empty list as a list of people with whom the other users may communicate over the controlled telephone line.

The option 415 selects a list of contacts as a list of people with which the other users may communicate over the controlled telephone line. The list of contacts may be an address book, a buddy list, a list of members of a social network of the controller, or a white list of people from whom e-mail is allowed. Calls from people not included in the contact list are blocked. On the other hand, the option 420 selects a list of contacts, such as a black list of people from whom e-mail is blocked, as a list of people who may not communicate with the other users over the controlled telephone line. Calls from people not included in the black list are allowed.

The options 425 and 430 enable selection of a list of contacts that may and may not, respectively, communicate with the other users over the controlled telephone line. More particularly, after selecting one of the options 425 and 430, the controller may use the text fields 435 and 440 and the buttons 445 and 450 to create or modify the corresponding list. The field 435 includes names of people that have been added to the list being specified. A name of a new person to be added to the list may be entered into the text field 440. The entered name is added to the list and is displayed in the text field 435 after the button 445 is selected. Selecting a name from the text field 435 and subsequently selecting the button 450 causes the selected name to be removed from the list. The removed name may be placed into the text field 440 to facilitate adding the name to the list again with the button 445. If the option 425 is selected, then calls from people who are not listed in the text field 435 are blocked. If the option 430 is selected, then calls from people who are not listed in the text field 435 are allowed.

A phone number or an identifier of a controller of the controlled telephone line may be entered in the text field 455. The phone number or the identifier may be used to identify and access the list selected with the options 405-430. For example, the selected list may be stored in a supervisory controls database, such as the supervisory controls database 135 of FIG. 1, and the selected list may be retrieved from the supervisory controls database using the phone number or the identifier entered into the text field 455. More particularly, when a call is placed to or from the entered phone number, the entered phone number or identifier may be used to retrieve the selected list from the supervisory controls database to determine whether the call should be allowed or blocked.

The buttons 460-475 enable changes made to the list of people who may communicate with the other users over the controlled telephone line with the interface 400 to be saved or discarded. More particularly, selecting the save button 460 causes the list selected with the options 405-430 to be associated with the phone number or the identifier entered in the text field 455. In addition, changes made to the selected list using the text fields 435 and 440 and the buttons 445 and 450 are saved when the save button 460 is selected. Selecting the cancel button 465 causes changes made with the interface 400 to be discarded. More particularly, selecting the cancel button 465 causes a list of people associated with one of the options 405-430 that was initially selected when the interface 400 was first displayed to remain associated with the phone number or the identifier initially entered in the text field 455, regardless of how the interface 400 was used since first being displayed. In addition, any changes to lists of people made with the text fields 435 and 440 and the buttons 445 and 450 are discarded when the cancel button 465 is selected. Selecting the save button 460 or the cancel button 465 causes the interface 400 to be dismissed. Alternatively, selecting the apply button 470 has the same effect as selecting the save button 460, except the interface 400 is not dismissed such that further selection and modification of lists of people may occur. The help button 475 may cause a tool that helps the controller use the interface 400 to be displayed when selected. The help tool may explain the various components of the interface 400 and the purpose and use of the interface 400.

Figure 5:
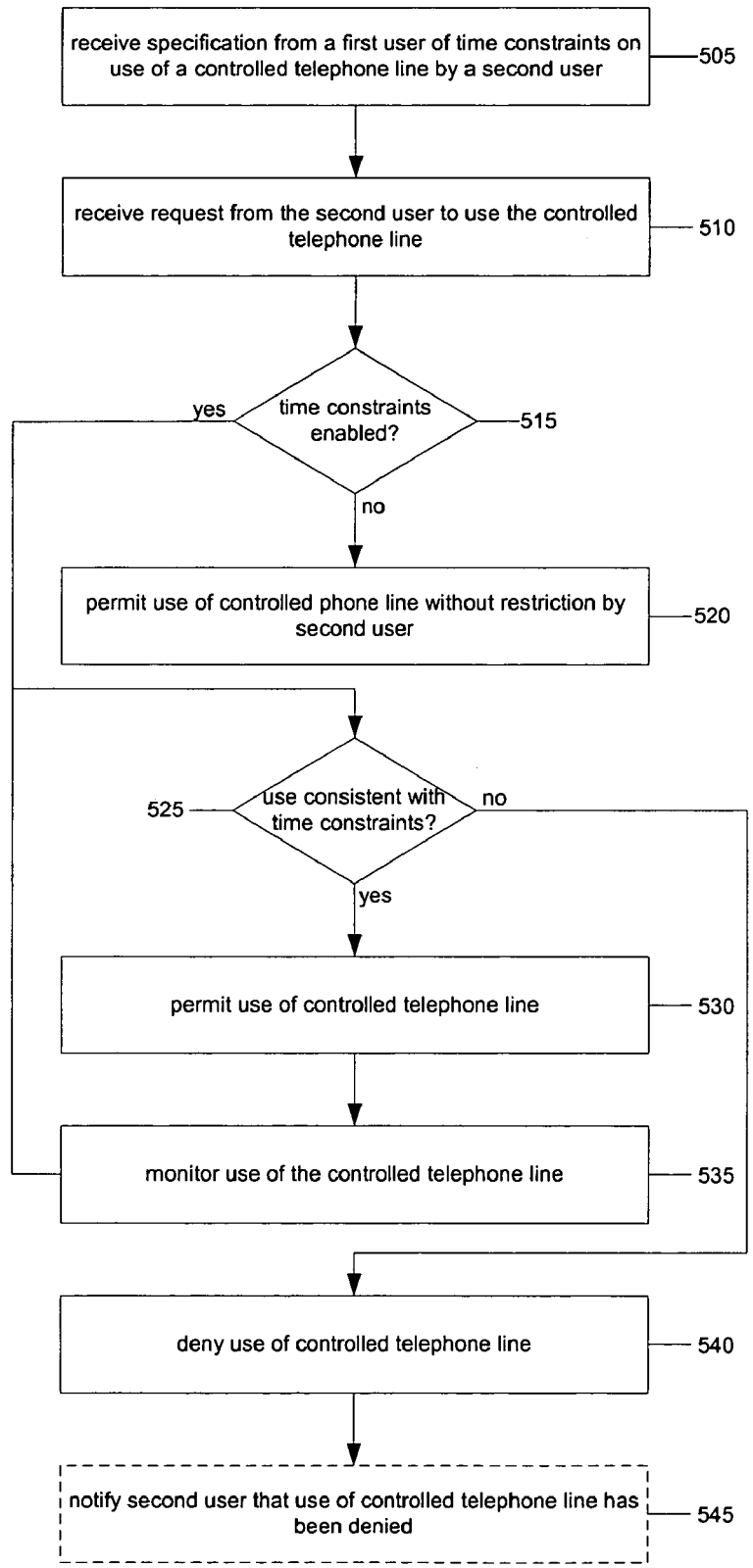
FIG. 5 is a flow chart of a process for handling a controlled telephone call based on a time at which the call is occurring.

Referring to FIG. 5, a process 500 is used to control telephone calls placed over a controlled telephone line such that the telephone calls satisfy time constraints on the use of the controlled telephone line. The time constraints are specified by a controller of the telephone line, and phone calls of other users of the controlled telephone line may be affected by the time constraints. The process 500 may be performed generally on the communications system 100, and more particularly on the supervisory controls system 120 and the online service provider system 130, all of FIG. 1.

A first user provides time constraints on the use of a controlled telephone line by a second user, and such time constraints are received by, for example, the online service provider system 130 (505). The first user may specify the time constraints on user interfaces presented on a computer system used by the first user, such as the client computer system 140 of FIG. 1. The computer system forwards the time constraints specified by the first user with the user interfaces to the online service provider system 130, which stores the time constraints in a supervisory controls database, such as the supervisory controls database 135 of FIG. 1, with an identifier of the controlled telephone line, such as a phone number of the controlled telephone line or an identifier of a controller of the controlled telephone line. The time constraints may limit the times at which the other users may place or receive telephone calls over the controlled telephone line. The time constraints also may limit the amount of time for which the other users may participate in telephone calls over the controlled telephone line.

A request to use the controlled telephone line is received from the second user (510). For example, the second user may request to use a client telephone, such as the client telephone 110 of FIG. 1, to call a person using an external telephone, such as the external telephone 105 of FIG. 1. Alternatively, a call to the second user from the person using the external telephone on the client telephone may be treated as a request from the second user. The supervisory controls system 120 or the online service provider system 130 determines whether time constraints are enabled for the second user (515). Such a determination may be based on local configuration information that identifies users of telephone lines whose calls are subject to time constraints. Alternatively or additionally, the online service provider system 130 may determine whether time constraints have been enabled for the second user by determining whether time constraints for the second user have been stored in the supervisory controls database.

If time constraints have not been enabled for the second user, then use of the controlled phone line by the second user is permitted without restriction (520). Therefore, the second user is permitted to communicate with the person using the external telephone, as requested. However, if time constraints have been enabled for the second user, then the supervisory controls system 120 determines whether the requested use of the controlled telephone line is consistent with the time constraints for the second user (525). For example, the supervisory controls system 120 may determine whether a time at which the second user requested to use the controlled telephone line is a time at which the time constraints indicate that the second user may use the controlled telephone time. If so, then the requested use of the controlled telephone line is consistent with the time constraints. As another example, the supervisory controls system 120 may determine if the second user has used the controlled telephone line for less than a maximum allowable amount of time for which the second user may use the controlled telephone line, with the maximum allowable amount of time being indicated by the time constraints. If so, then the requested use of the controlled telephone line is consistent with the time constraints.

If the requested use is consistent with the time constraints, then the second user is permitted to use the controlled telephone line (530). For example, the supervisory controls system 120 may signal a telephone network that connects the client telephone and the external telephone, such as the telephone network 115 of FIG. 1, to enable the second user to use the controlled telephone to communicate with the person using the external telephone. The supervisory controls system 120 may monitor the use of the controlled telephone line by the second user to verify that the use remains consistent with the time constraints (535). For example, as the second user uses the controlled telephone line, the supervisory controls system 120 verifies that the second user is still using the controlled telephone line at a time when the time constraints indicate that the second user may use the controlled telephone line, or that the second user still has used the controlled telephone line for less than the maximum allowable amount of time for which the second user may use the controlled telephone line that is indicated by the time constraints. If the use of the phone line remains consistent with the time constraint (525), then the call is permitted to proceed normally (530)

If the requested use becomes inconsistent with the time constraints, or initially was inconsistent with the time constraints, then the second user is denied use of the controlled telephone line (540). For example, the supervisory controls system 120 may signal the telephone network to prevent the second user from using the client telephone to communicate with the person using the external telephone.

The second user may be notified that use of the controlled phone line has been denied (545). For example, a message that indicates that use of the controlled telephone line has been denied may be sent to the client telephone for presentation to the second user.

In some implementations, when the second user's use of the controlled telephone line is being monitored, the second user may be notified that use of the controlled telephone line is about to become inconsistent with the time constraints. For example, the second user may be notified that, in two minutes, use of the controlled telephone line will be inconsistent with the time constraints because the current time will become a time at which the time constraints do not allow the second user to use the controlled telephone line. As a result, the second user is given a warning and has time to finish using the controlled telephone line before the use is denied as a result of becoming inconsistent with the time constraints.

Figure 6:
FIGS. 6 and 7 are illustrations of interfaces for specifying times at which controlled telephone calls may and may not occur.

Referring to FIG. 6, an exemplary interface 600 may be used by a controller of a controlled telephone line to specify times at which other users of the controlled telephone line may or may not communicate over the controlled telephone line. Alternatively or additionally, the interface 600 may be used by the controller to specify amounts of time for which the other users may communicate over the controlled telephone line. The interface 600 includes options 605-625 that may be used to select one of the lists of people. Times at which the other users may use the controlled telephone line are listed in a time chart 630. A time zone that includes the controlled telephone line may be chosen with a time zone selection list 635. Buttons 640 and 645 are used to accept and reject changes made with the interface 600. In certain implementations, time constraints may be placed only on calls to particular people or numbers, or may not apply to calls to particular people or numbers (e.g., emergency numbers).

The options 605-625 enable a controller of a controlled telephone line to specify times and amounts of times for which other users of the controlled telephone line may or may not communicate over the controlled telephone line. In one implementation, the options 605-625 are mutually exclusive in that only one of the options 605-625, and only one of the corresponding times or amounts of times, may be selected. In another implementation, more than one of the options 605-625 may be selected simultaneously.

The option 605 causes all calls placed to and from the controlled telephone line to be blocked such that the other users may not communicate over the controlled telephone line at any time.

Selecting the options 610 and 615 enables the other users to use the controlled telephone line at predetermined times. More particularly, selecting the option 610 enables the other users to use the controlled telephone line between 8 P.M. and 10 P.M. each day, and selecting the option 615 enables the other users to use the controlled telephone line all day each Saturday and Sunday. The predetermined times selected with the options 610 and 615 may be popular times at which the controlled telephone line is likely to be used. Alternatively or additionally, the predetermined times may be times at which use of the controlled telephone line is most permissible. For example, when the other users are children, the predetermined times may be times at which the children are not at school and are not doing homework. As another example, when the other users are employees, the predetermined times may be times outside of regular business hours. The options 610 and 615 facilitate selection of the predetermined times as the times at which the other users may use the controlled telephone line.

Selecting the option 620 enables the other users to use the controlled telephone line for a particular amount of time (e.g., 8 hours) each day. In other words, when the option 620 is selected, the other users may use the controlled telephone line at any time, provided that the total amount of use of the controlled telephone line does not exceed the particular amount of time indicated by the option 620. In one implementation, the option 620 includes a selection box with which the particular amount of time may be selected.

Selecting the option 625 enables the other users to use the controlled telephone line at times specified by the controller of the telephone line using the interface 600. When the option 625 is selected, the controller specified times are selected as times at which the other users may use the controlled telephone line. The controller specified times are displayed in the time chart 630. As illustrated in the time chart 630, each of the controller specified times includes a start time and an end time of a period during which use of the controlled telephone line is permitted, as well as an amount of time for which the controlled telephone line may be used during the period. In one implementation, as shown, the controller specifies one period and a corresponding amount of time for each day of the week.

Figure 7:

Referring also to FIG. 7, the option 625 may include a control, such as a link or a button, that, when selected, causes an exemplary interface 700 to be displayed. The interface 700 enables the controller to specify the times at which, and the amounts of time for which, the other users may use the controlled telephone line. The times are amounts of time that are specified with the interface 700 and are listed in the time chart 630. More particularly, the interface 700 includes time controls 705a-705g that enable the specification of periods of time during which use of the controlled telephone line is permitted and of amounts of time during the periods of time for which the controlled telephone line may be used. In one implementation, each of the time controls 705a-705g includes a first selection list in which a beginning of a period of time during which use of the parentally controlled telephone line is permitted may be specified. Similarly, each of the time controls 705a-705g includes a second selection list in which an end of the period of time may be specified. The time controls 705a-705g also include a third selection list with which the amount of allowable use of the controlled telephone line within the period of time may be specified. In one implementation, the interface 700 includes one time control for each day of the week such that a period of time and a corresponding amount of time may be specified for each day of the week. In other implementations of the interface 700, the time controls 705a-705g may be used to specify periods of times during which use of the controlled telephone line is not permitted.

The interface 700 also includes buttons 710 and 715 that enable changes made to the times at which the other users may use the controlled telephone line with the interface 700 to be saved or discarded. More particularly, selecting the apply button 710 causes the time periods and corresponding amounts of times specified with the time controls 705a-705g to be saved and reflected in the time chart 630. Selecting the cancel button 715 causes changes made with the interface 700 to be discarded. More particularly, selecting the cancel button 715 causes the time periods and amounts of time that were initially specified by the time controls 705a-705g when the interface 700 was first displayed to remain unchanged in the time chart 630, regardless of how the interface 700 was used since first being displayed. Selecting the apply button 710 or the cancel button 715 may cause the interface 700 to be dismissed.

Referring again to FIG. 6, the time zone selection list 635 enables specification of a time zone that includes the controlled telephone line. The times at which the controlled telephone line may or may not be used are specified relative to the time zone of the controlled telephone line by the controller of the telephone line. However, the specified time limitations are enforced by a supervisory controls system, such as the supervisory controls system 120 of FIG. 1, and an online service provider system, such as the online service provider system 130 of FIG. 1, that may not be in the same geographic location as the controlled telephone line. Furthermore, the supervisory controls system and the online service provider system may be in a different time zone from the controlled telephone line. Specifying the time zone of the controlled telephone line with the time zone selection list 635 enables the supervisory controls system and the online service provider system to properly enforce the time limitations on use of the parentally controlled telephone when a time difference exists between the supervisory controls system, the online service provider system, and the controlled telephone line.

The buttons 640 and 645 enable changes made to the times at which the other users may use the controlled telephone line with the interface 600 to be saved or discarded. More particularly, selecting the save button 640 causes times and amounts of times selected with the options 605-625 to be saved and applied to future calls on the controlled telephone line. Selecting the cancel button 645 causes changes made with the interface 600 to be discarded. More particularly, selecting the cancel button 645 causes the times and the amounts of time indicated by an initial selection of the options 605-625 when the interface 600 was first displayed to remain unchanged, regardless of how the interface 600 was used since first being displayed. Selecting the save button 640 or the cancel button 645 may cause the interface 600 to be dismissed.

Other interfaces similar to the interfaces 600 and 700 used by a controller of a controlled telephone line to specify times at which other users of the controlled telephone line may or may not communicate over the controlled telephone line, or to specify amounts of time for which the other users may communicate over the controlled telephone line. The other interfaces may, for example, enable the controller to specify times during a particularly week, month, year, or other time period during which the other users may use the controlled telephone line, instead of during a particular day, as is enabled by the interfaces 600 and 700. Furthermore, the other interfaces may enable the controller to specify amounts of time for which the other users may communicate over the controlled telephone time per week, month, year, or other time period, instead of per day, as is enabled by the interfaces 600 and 700.

Figure 8:
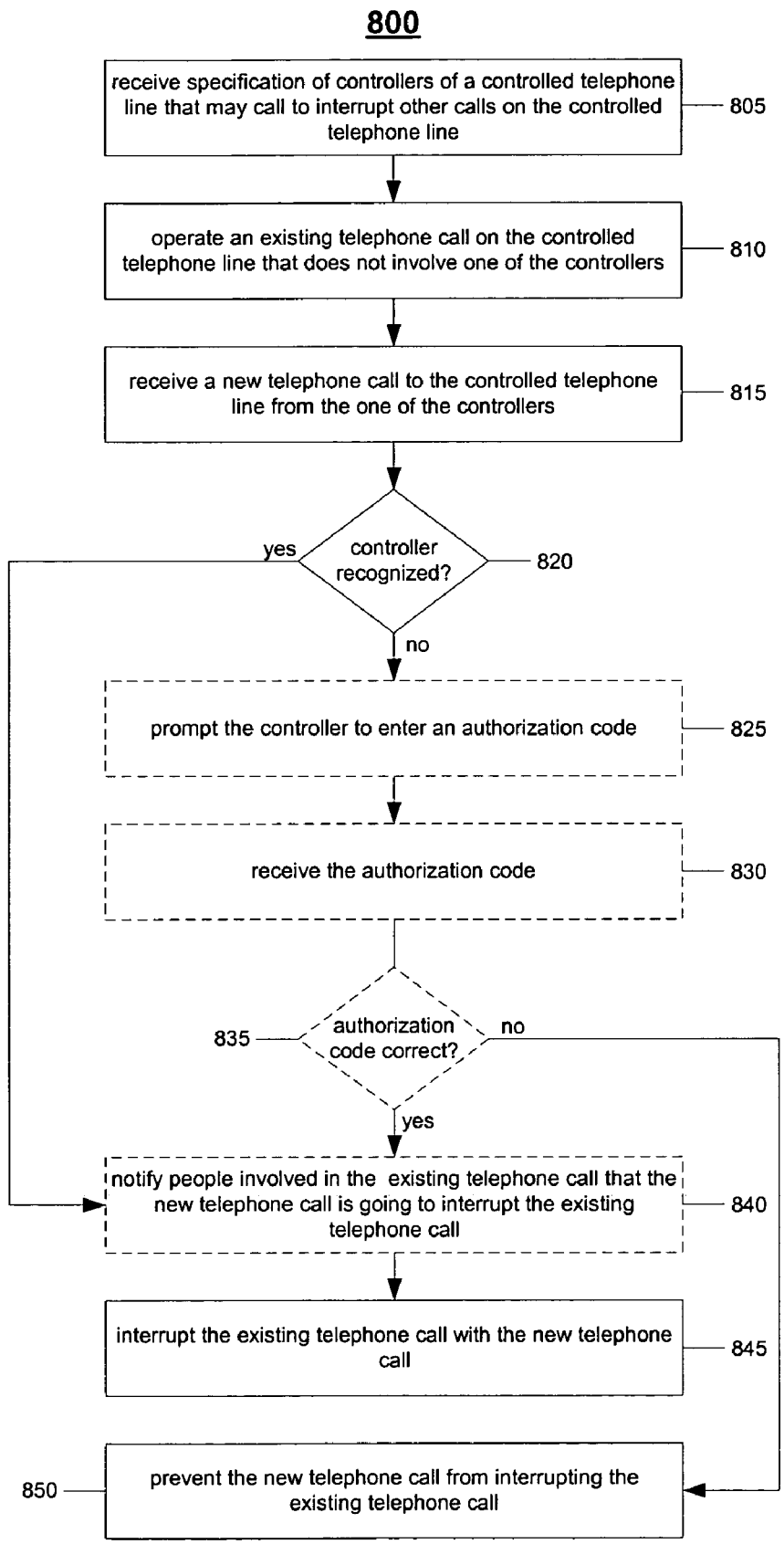
FIG. 8 is a flow chart of a process for enabling telephone line controllers to interrupt calls on a controlled telephone line.

Referring to FIG. 8, a process 800 is used to enable calls from a first user (e.g., a parent or an employer) of a controlled telephone line to interrupt other calls using the controlled telephone line. Identifiers of the first user and other controllers of the controlled telephone line may be specified by the first user. When a call is received from one of the specified controllers, existing calls on the controlled telephone line are interrupted. The first user may desire to interrupt use of the controlled telephone line, for example, in an emergency, or to limit use of the controlled telephone line. The process 800 may be performed generally on the communications system 100, and more particularly on the supervisory controls system 120 and the online service provider system 130, all of FIG. 1.

A first user of the controlled telephone line specifies controllers of the controlled telephone line that may interrupt calls on the controlled telephone line, and such specification is received by, for example, the online service provider system 130 (805). The first user may specify the controllers on user interfaces presented on a computer system used by the first user, such as the client computer system 140 of FIG. 1. The computer system forwards the list of controllers specified by the first user to the online service provider system 130, which stores the list of controllers in a supervisory controls database, such as the supervisory controls database 135 of FIG. 1, with an identifier of the controlled telephone line, such as a phone number of the controlled telephone line or an identifier of a controller of the controlled telephone line. The list of controllers limits the people that may call to interrupt existing calls on the controlled telephone line.

An existing telephone call that does not involve the first user, or another of the controllers, is operated on the controlled telephone line (810). For example, a user of the controlled telephone line other than the first user may use a client telephone connected to the controlled telephone line, such as the client telephone 110 of FIG. 1, to call a person that is not the first user on an external telephone, such as the external telephone 105 of FIG. 1. Alternatively, a call from the particular person on the external telephone to the user on the client telephone may be received on the controlled telephone line. A telephone network connecting the external telephone and the client telephone, such as the telephone network 115 of FIG. 1, may operate the call, provided other restrictions on the use of the controlled telephone line by the user of the client telephone are satisfied.

A new telephone call to the controlled telephone line is received while the existing telephone call is operating (815). The new telephone call may be from the first user (also referred to as the controller of the controlled telephone line), who may desire to interrupt the existing telephone call. For example, the first user may use an external telephone that is similar to the external telephone 105 of FIG. 1 to call the client telephone while the client telephone is in use. A telephone network connecting the external telephone and the client telephone, such as the telephone network 115 of FIG. 1, may route the new call to the supervisory controls system 120 along with information describing the requested call, such as telephone numbers of the client telephone and the external telephone, identifiers of users of the client telephone and the external telephone, and a time at which the call was requested.

The supervisory controls system 120 or the online service provider system 130 determines whether the number from which the first user is a telephone line controller that may interrupt calls on the controlled telephone line (820). The supervisory controls system 120 may identify the first user based on information routed to the supervisory controls system 120 by the telephone network that connects the client telephone and the external telephone, or on information stored by the online service provider system 130. The identified user is compared to the previously specified users to determine whether the first user may interrupt the existing telephone call.

If the number from which the first user is calling is not recognized as a number from which the first user may interrupt the controlled telephone line, or if the first user is not recognized as a controller that may interrupt the controlled telephone line, then the supervisory controls system 120 prompts the first user to enter an authorization code (825). The authorization code enables the first user to interrupt the controlled telephone line from a phone number that was not previously specified as a phone number from which the first user may interrupt the controlled telephone line. Alternatively, the authorization code enables the first user to interrupt the controlled telephone line when the first user was not specified as a controller that may interrupt the controlled telephone line. For example, when the first user needs to interrupt the controlled telephone line and is not at a telephone number typically used by the first user, the first user may call the controlled telephone line and use the authorization code to interrupt the controlled telephone line. More particularly, the first user then enters the authorization code, and the supervisory controls system 120 receives the entered authorization code (830). The first user may enter the authorization code on a keypad of a telephone used by the first user.

The supervisory controls system 120 determines whether the received authorization code is correct (835). The supervisory controls system 120 may do so by comparing the received authorization code to an authorization code specified with the controllers that may interrupt the controlled telephone line. If the authorization code is correct, then people involved in the existing telephone call that is operating on the controlled telephone line may be notified that the new call is going to interrupt the existing call (840). For example, an audio message including such a notification may be played over the controlled telephone line to the people involved in the call, including the user of the controlled telephone. Notifying the people involved in the existing call of the pending interruption helps to ensure the privacy of those people by enabling those people to prepare for the interruption.

If the first user is recognized as a controller of the controlled telephone line (820), or if the authorization code entered in response to an unrecognized number is correct (835), then the supervisory controls system 120 interrupts the existing telephone call with the new telephone call (845). In one implementation, the existing call may be terminated, and the new call may be sent to the controlled telephone line such that the user of the controlled telephone may communicate with the first user as part of the new call. In another implementation, interrupting the new call may include placing the people involved in the existing call, except for the user of the client telephone, on hold, while the new call between the user of the client telephone and the first user is operated. Once the new call is completed, the existing call may be resumed and completed. In another implementation, interrupting the new call may include establishing a three-way call between the people involved in the existing call and the first user, which effectively bridges the first user into the existing call. In such implementations, only the user of the client telephone may be enabled to hear or communicate with the first user, while other people involved in the existing call do not detect that the first user has been bridged into the existing call.

If the first user is not recognized as a controller of the controlled telephone line, and if the entered authorization code was not correct, then the supervisory controls system 120 may prevent the new telephone call from interrupting the existing telephone call (850). For example, the new telephone call may ring busy for the first user. Alternatively or additionally, a notification, such as an audio message, indicating that the new phone call will not interrupt the existing phone call may be presented to the first user. The new call also may be routed to another system, such as a voicemail system, such that the first user may leave a message for the other users of the controlled telephone line.

Figure 9:
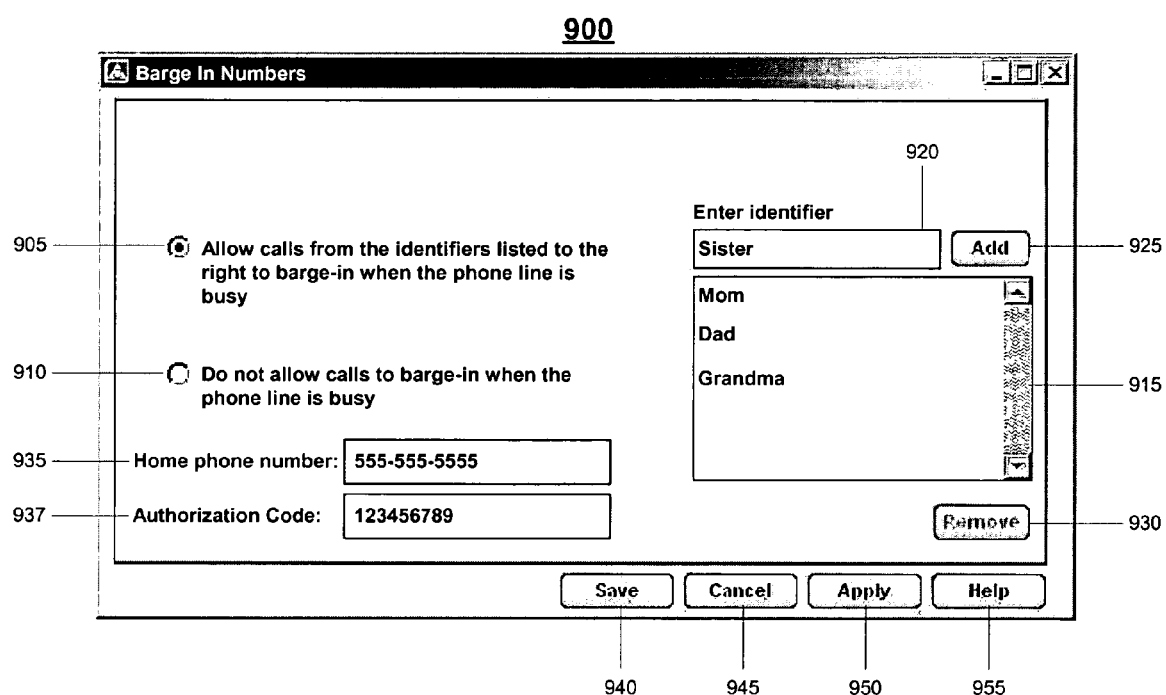
FIG. 9 is an illustration of an interface for specifying telephone line controllers that may interrupt calls on a controlled telephone line.

Referring to FIG. 9, an exemplary interface 900 may be used by a first user of a controlled telephone line to specify controllers that may interrupt the controlled telephone line. While the controlled telephone line is busy with a telephone call, calls from one of the controllers are enabled to interrupt the telephone call. The interface 900 includes options 905 and 910 that may be used to indicate whether calls over the controlled telephone line may be interrupted by calls from one of the controllers. Text fields 915 and 920 and buttons 925 and 930 are used to specify and display identifiers of the controllers. A text field 935 is used to specify an identifier of a controller of the controlled telephone line, and a text field 937 is used to specify an authorization code. Buttons 940-955 are used to accept and reject changes made with the interface 900.

The options 905 and 910 enable a first user of a controlled telephone line to indicate whether calls over the controlled telephone line may be interrupted by calls from the controllers specified with the interface 900. When selected, the option 905 enables calls over the controlled telephone line to be interrupted by calls from the controllers. More particularly, calls people with identifiers listed in the text field 915 are enabled to interrupt existing calls on the controlled telephone line. Alternatively, selecting the option 910 prevents calls over the controlled telephone line from being interrupted. In other words, an empty list of controllers may be selected with the option 910.

After selecting the option 905, the first user may use the text fields 915 and 920 and the buttons 925 and 930 to create or modify the list of controllers. The text field 915 includes identifiers of controllers that have been added to the list being specified. An identifier of a controller to be added to the list may be entered into the text field 920. The identifier is added to the list and is displayed in the text field 915 after the button 925 is selected. Selecting an identifier from the text field 915 and subsequently selecting the button 930 causes the selected identifier to be removed from the list. The removed identifier may be placed into the text field 920 to facilitate adding the identifier to the list again with the button 925.

A phone number of the controlled telephone line, or an identifier of a controller of the controlled telephone line, may be entered in the text field 935. The phone number or the identifier may be used to identify and access the list of controllers. For example, the list may be stored in a supervisory controls database, such as the supervisory controls database 135 of FIG. 1, and the list may be retrieved from the supervisory controls database using the phone number or the identifier entered into the text field 935. More particularly, when a call is placed to the controlled telephone line, the entered phone number or identifier may be used to retrieve the list from the supervisory controls database to determine whether the call should be enabled to interrupt an existing call.

An authorization code for the controlled telephone line may be entered in the text field 937. The authorization code may be used to enable the first user of the controlled telephone line to interrupt other calls using the controlled telephone line when calling from a phone number that is not typically used by the controller. Alternatively, the authorization code may be used to enable other controllers of the controlled telephone line that are not identified in the text field 915 to interrupt the other calls. More particularly, when the first user calls the controlled telephone line to interrupt a call already operating on the controlled telephone line from a telephone number that is not included in the list of phone numbers, the authorization code may be entered by the first user to interrupt the call. The authorization code is associated with the list of identifiers of controllers in the supervisory controls database such that the authorization code is accessed when the first user calls the controlled telephone line.

The buttons 940-955 enable changes made to the list of controllers using the interface 900 to be saved or discarded. More particularly, selecting the save button 940 causes the indication of whether calls over the controlled telephone line may be interrupted by calls from the controllers, which was selected with the options 905 and 910, to be associated with the phone number or the identifier entered in the text field 935. In addition, changes made to the list of identifiers using the text fields 915 and 920 and the buttons 925 and 930 are saved when the save button 940 is selected. Selecting the cancel button 945 causes changes made with the interface 900 to be discarded. More particularly, selecting the cancel button 945 causes the selection of the options 905 and 910 when the interface 900 was first displayed to remain associated with the phone number or the identifier initially entered in the text field 935, regardless of how the interface 900 was used since first being displayed. In addition, any changes to the list of identifiers of controllers made with the text fields 915 and 920 and the buttons 925 and 930 are discarded when the cancel button 945 is selected. Selecting the save button 940 and the cancel button 945 causes the interface 900 to be dismissed. Alternatively, selecting the apply button 950 has the same effect as selecting the save button 940, except that the interface 900 is not dismissed such that further modification of the list of identifiers of controllers may occur. The help button 955, when selected, causes a tool that helps the first user use the interface 900 to be displayed. The help tool may explain the various components of the interface 900 and the purpose and use of the interface 900.

Various techniques are described for applying special handling to phone calls that use a controlled telephone line, based on constraints on use of the controlled telephone line that have been specified by a controller of the controlled telephone line. For example, the constraints may limit the people with whom users of the controlled telephone line may communicate, and the times at which the users may use the controlled telephone line. In addition, the controller may constrain use of the controlled telephone line by interrupting calls on the controlled telephone line. Multiple types of constraints may be applied simultaneously to the controlled telephone line. For example, constraints may be combined such that the users of the controlled telephone line may only communicate with particular people at particular times, or such that the users may not communicate with particular people at particular times. As another example, the constraints may be used to allow the controller to interrupt calls on the controlled telephone line when the calls do or do not involve particular people, or when the calls are at particular times. As a result, complex handling may be applied to calls on the controlled telephone line based on a combination of multiple types of constraints.

Graphical user interfaces are described throughout as enabling a telephone line controller to specify supervisory controls for a controlled telephone line. Alternatively, telephone-based user interfaces may be provided to enable the controller to specify the supervisory controls. For example, a keypad of a telephone used by the controller may be used to specify identifiers of people with whom other users of the controlled telephone line may or may not communicate, times at which the other users may or may not use the controlled telephone line, or identifiers of people that may interrupt calls on the controlled telephone line. Alternatively, the described graphical user interfaces may be presented to the controller on a display of the telephone used by the controller, and the controller may interact with the graphical user interfaces using input devices of the telephone.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method of interrupting telephone calls, the method comprising:

receiving specification from a first user that defines telephone line controllers whose calls are enabled to interrupt other calls on a controlled telephone line;

operating a telephone call on the controlled telephone line that does not involve one of the telephone line controllers;

receiving a telephone call to the controlled telephone line while the controlled telephone line is busy with the operated call;

determining whether the received call was placed by one of the telephone line controllers; and enabling the received call to interrupt the operated call when the received call is from one of the telephone line controllers.

2. The method of claim 1 wherein receiving the specification from the first user that defines the telephone line controllers whose calls are enabled to interrupt other calls on a controlled telephone line comprises presenting for use by the first user a graphical user interface capable of receiving the specification of the telephone line controllers whose calls are enabled to interrupt other calls on a controlled telephone line.

3. The method of claim 1 wherein the specification from the first user defines phone numbers from which the telephone line controllers may place telephone calls to the controlled telephone line.

4. The method of claim 3 wherein determining whether the received call was placed by one of the telephone line controllers comprises determining whether the received call is from one of the phone numbers from which the telephone line controllers may place telephone calls to the controlled telephone line.

5. The method of claim 1 wherein receiving the specification that defines the telephone line controllers comprises receiving the specification from an online service provider system used by one of the telephone line controllers.

6. The method of claim 1 wherein determining whether the received call was placed by one of the telephone line controllers comprises querying for the presence of a caller that placed the received call in a database of telephone line controllers.

7. The method of claim 1 wherein enabling the received call to interrupt the operated call comprises:

notifying entities involved in the operated call that the operated call is going to be interrupted; and interrupting the operated call with the received call.

8. The method of claim 7 wherein notifying the entities involved in the operated call comprises playing a message for the entities involved in the operated call announcing that the operated call is going to be interrupted.

9. The method of claim 1 wherein:

the method further comprises:

prompting a caller that placed the received call for a code; and receiving the code from the caller;

determining whether the received call was placed by one of the telephone line controllers comprises determining whether the received code matches an authorization code that indicates that the caller is one of the telephone line controllers; and enabling the received call to interrupt the operated call comprises enabling the received call to interrupt the operated call when the received code matches the authorization code.

10. The method of claim 9 wherein:

prompting the caller for the code comprises prompting the caller to dial the code on a telephone used by the caller to place the received call; and receiving the code from the caller comprises receiving the code as a series of dialed numbers from the telephone used by the caller.

11. The method of claim 1 wherein:

the method further comprises determining if an entity involved in the telephone call that is operating on the controlled telephone line is an entity that has been specified by the first user as an entity whose calls over the controlled telephone line may be interrupted;

enabling the received call to interrupt the operated call comprises enabling the received call to interrupt the operated call when the received call is from one of the telephone line controllers and when the entity involved in the telephone call operating on the controlled telephone line is an entity whose calls may be interrupted.

12. The method of claim 1, the method further comprising determining if an entity involved in the telephone call that is operating on the controlled telephone line is an entity that has been specified by the first user as an entity whose calls over the controlled telephone line may not be interrupted, wherein:

enabling the received call to interrupt the operated call when the received call is from one of the telephone line controllers comprises enabling the received call to interrupt the operated call when the received call is from one of the telephone line controllers and when the entity involved in the telephone call operating on the controlled telephone line is not an entity whose calls may not be interrupted.

13. The method of claim 1, the method further comprising determining if time information specified by the first user indicates that the operated call may be interrupted, wherein:

enabling the received call to interrupt the operated call when the received call is from one of the telephone line controllers comprises enabling the received call to interrupt the operated call when the received call is from one of the telephone line controllers and when the time information indicates that the operated call may be interrupted.

14. The method of claim 1, the method further comprising determining if time information specified by the first user indicates that the operated call may not be interrupted, wherein:

enabling the received call to interrupt the operated call when the received call is from one of the telephone line controllers comprises enabling the received call to interrupt the operated call when the received call is from one of the telephone line controllers and when the time information does not indicate that the operated call may be interrupted.

15. The method of claim 1 wherein the telephone line controllers are users of the telephone line.

* * * * *